United States Patent
Song et al.

(10) Patent No.: US 12,238,563 B2
(45) Date of Patent: Feb. 25, 2025

(54) METHOD AND DEVICE FOR MEASURING PERFORMANCE IN WIRELESS COMMUNICATION SYSTEM

(71) Applicant: SAMSUNG ELECTRONICS CO., LTD., Suwon-si (KR)

(72) Inventors: Junhyuk Song, Suwon-si (KR); Chungkeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 258 days.

(21) Appl. No.: 17/843,931

(22) Filed: Jun. 17, 2022

(65) Prior Publication Data

US 2022/0330070 A1 Oct. 13, 2022

Related U.S. Application Data

(63) Continuation of application No. PCT/KR2020/018579, filed on Dec. 17, 2020.

(30) Foreign Application Priority Data

Dec. 17, 2019 (KR) .................. 10-2019-0169296

(51) Int. Cl.
 *H04W 24/10* (2009.01)
 *H04W 24/02* (2009.01)
 *H04W 28/02* (2009.01)

(52) U.S. Cl.
 CPC .......... *H04W 24/10* (2013.01); *H04W 24/02* (2013.01); *H04W 28/0268* (2013.01)

(58) Field of Classification Search
 CPC . H04W 24/10; H04W 24/02; H04W 28/0268; H04W 92/12; H04W 88/18
 (Continued)

(56) References Cited

U.S. PATENT DOCUMENTS

| 10,925,107 | B2 | 2/2021 | Saily et al. |
| 11,582,682 | B2 | 2/2023 | Wang et al. |

(Continued)

FOREIGN PATENT DOCUMENTS

| CN | 106911760 | 6/2017 |
| CN | 107959983 | 4/2018 |

(Continued)

OTHER PUBLICATIONS

Chinese Office Action issued Mar. 29, 2024 in corresponding Chinese Patent Application No. 202080088511.7 and English-language translation.

Czichy, "5G RAN optimization using the O-RAN software community's RIC (RAN Intelligent Controller)", Nokia, Sep. 23, 2019, 23 pages.

(Continued)

*Primary Examiner* — Rownak Islam
(74) *Attorney, Agent, or Firm* — Nixon & Vanderhye, P.C.

(57) ABSTRACT

According to various embodiments of the present disclosure, a method for an E2 node comprises: transmitting an indication message including a measurement container to a radio access network (RAN) intelligent controller (RIC), wherein the measurement container may include at least one among: first measurement information of a digital unit (DU), the first measurement information including at least one of physical resource block (PRB) usage information for a standalone (SA) structure and PRB usage information for a non-standalone (NSA) structure; second measurement information of a central unit control plane (CU-CP), the second measurement information including information about the number of active user equipments (UEs); and third measurement information including at least one of packet data conversion protocol (PDCP) usage information for the SA structure and the PRB usage information for the NSA structure.

15 Claims, 11 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2008/0117850 | A1 | 5/2008 | Agrawal et al. |
| 2010/0260096 | A1 | 10/2010 | Ulupinar et al. |
| 2015/0208274 | A1 | 7/2015 | Himayat et al. |
| 2015/0341802 | A1 | 11/2015 | Chiang et al. |
| 2017/0094017 | A1 | 3/2017 | Jakobs |
| 2018/0324752 | A1 | 11/2018 | Kim |
| 2021/0029580 | A1* | 1/2021 | Gupta ................. H04W 36/023 |
| 2022/0295324 | A1* | 9/2022 | Pantelidou ............ H04W 24/10 |

FOREIGN PATENT DOCUMENTS

| | | | | |
|---|---|---|---|---|
| CN | 111 654 877 | | 9/2020 | |
| CN | 111654877 A | * | 9/2020 | ............ H04W 24/08 |
| EP | 4 050 967 | | 8/2022 | |
| EP | 4072241 | | 10/2022 | |
| KR | 10-1734032 | | 5/2017 | |
| WO | 2016/093989 | | 6/2016 | |
| WO | 2017/147751 | | 9/2017 | |
| WO | 2021/010693 | | 1/2021 | |

OTHER PUBLICATIONS

ORAN-WG2, ORAN Working Group 2 (Non-RT RIC & A1 interface), 2019, 29 pages.
Czichy, T. "5G Ran optimization using the O-RAN software community's RIC (Ran Intelligent Controller)" ONS Europe, Sep. 23, 2019. (23 pages).
"ORAN-WG2.Use Case Requirements v01.00, O-RAN Working Group 2 (Non-RT RIC & A1 interface)" O-RAN Alliance, 2019. pp. 1-29 (29 pages).
"Global 5G: Implications of a Transformational Technology" Rysavy Research/5G Americas, Sep. 2019 (254 pages).
"Email discussion for R17 proposals on slicing" 3GPP TSG RAN Meeting #85, RP-191778, CMCC, Sep. 16-20, 2019 (43 pages).
Extended European Search Report and Written Opinion dated Jan. 5, 2023 issued by the European Patent Office for European Patent Application No. 20903395.0.
"O-RAN Working Group 2 (Non-RT RIC & A1 interface)", Jun. 2019, 31 pages.
Chinese Notice of Allowance issued Aug. 16, 2024 in corresponding Chinese Patent Application No. 202080088511.7.
3GPP TSG-RAN, "LS on O-RAN Alliance & 3GPP Coordination on O-RAN Alliance Outputs", Meeting Notes, Meeting #85, Sep. 16-20, 2019, 3 pages.
Communication pursuant to Article 94(3) EPC dated Dec. 19, 2024 in European Patent Application No. 20903395.0.

* cited by examiner

| per-CU-CP Name | QCI |
| --- | --- |
| | Number of Active UEs |

FIG.9

METHOD AND DEVICE FOR MEASURING PERFORMANCE IN WIRELESS COMMUNICATION SYSTEM

CROSS-REFERENCE TO RELATED APPLICATIONS

This application is a continuation of International Application No. PCT/KR2020/018579 designating the United States, filed on Dec. 17, 2020, in the Korean Intellectual Property Receiving Office and claiming priority to Korean Patent Application No. 10-2019-0169296, filed on Dec. 17, 2019, in the Korean Intellectual Property Office, the disclosures of which are incorporated by reference herein in their entireties.

BACKGROUND

Field

The disclosure relates to an apparatus and a method for measuring performance on an E2 interface in a radio access network. The disclosure relates to an apparatus and a method for transmitting a container-based measurement message when a service event regarding a base station, which follows open-radio access network (O-RAN) standards using an E2 message of a wireless communication system, occurs.

Description of Related Art

Efforts to develop enhanced $5^{th}$ generation (5G) communication systems or pre-5G communication systems have been ongoing in order to meet the increasing demand for wireless data traffic since $4^{th}$ generation (4G) communication systems were commercialized. For this reason, the 5G communication systems or pre-5G communication systems are called Beyond 4G network communication systems or post long term evolution (LTE) systems.

The 5G communication system is considered to be implemented in a superhigh frequency (mmWave) band (for example, 60 GHz band) to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of a radio wave and to increase a transmission distance of a radio wave in the superhigh frequency band.

In addition, technologies for evolved small cells, advanced small cells, cloud radio access network (RAN), ultra-dense network, device to device communication (D2D), wireless backhaul, moving network, cooperative communication, coordinated multi-points (CoMP), and interference cancellation in the 5G communication systems are developing to enhance networks of systems.

In addition, hybrid frequency shift keying and quadrature amplitude modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA) which are enhanced accessing technology in the 5G systems are developing.

In order to meet the demand for wireless data traffic, a 5G system, new radio or next radio (NR) are commercialized, and it is expected that services of a high data transmission rate are provided to users through a 5G system like 4G, and wireless communication services having various purposes, such as Internet of Things (IoT) and a service requiring high reliability for a specific purpose, are provided. The open radio access network (O-RAN), which was established by operators and equipment providers in a system mixed with a 4G communication system and a 5G system, defines new network element (NE) and interface standards based on existing $3^{rd}$ generation partnership project (3GPP) standards, and suggests an O-RAN structure.

SUMMARY

Embodiments of the disclosure provide an apparatus and a method for an E2 node to transmit measurement information to a radio access network (RAN) intelligent controller (RIC) in a wireless communication system.

Embodiments of the disclosure provide an apparatus and a method for an E2 node to transmit measurement information for a distributed unit (DU), a central unit (CU)-control plane (CP), a central unit (CU)-user plane (UP) in a wireless communication system.

Embodiments of the disclosure provide an apparatus and a method for an E2 node to transmit measurement information in a type that is determined according to whether the E2 node is a standalone (SA) structure or a non-standalone (NSA) structure in a wireless communication system.

Embodiments of the disclosure provide an apparatus and a method for an E2 node to transmit measurement information based on a quality identifier (for example, at least one of a quality of service class identifier (QCI), 5G QoS identifier (5QI), Slice ID) in a wireless communication system.

As $4^{th}$ generation/$5^{th}$ generation communication systems (hereinafter, referred to as 4G/5G systems or new radio or next radio (NR)) are currently commercialized, there is a demand for support of a differentiated service for a user in a virtualized network. The O-RAN newly defined existing $3^{rd}$ generation partnership project (3GPP) NE, RU, DU, CU-CP, CU-UP as O-RU, O-DU, O-CU-CP, O-CU-UP, respectively, and additionally standardized a near-real-time RAN intelligent controller (RIC). Herein, the O-RU, O-DU, O-CU-CP, O-CU-UP may be understood as entities of the RAN, which operate according to O-RAN standards, and may be referred to as an E2 node. The RIC generates an E2 subscription request message, and transmits the same to the E2 node (for example, the O-CU-CP, O-CU-UP, O-DU), thereby setting up a call processing event. After setting up the event, the E2 node transmits a subscription request response message to the RIC. The disclosure relates to an E2 indication message that a newly defined RIC transmits in the form of a container, which is classified according to a stand alone structure, a non-stand alone structure, a cell unit, a slice unit, a 5QI unit, a QCI unit in a period set in a subscription event condition in O-DU, O-CU-CP, O-CU-UP.

To address the above-described problems, example embodiments of the disclosure provide a method of a first node in a wireless communication system, the method including: classifying, by an E2 node, a call processing message received from a call processing block per E2 node; classifying the classified message into a stand alone structure, a non-stand alone structure; generating as a container in the unit of a global cell, a public land mobile network (PLMN), a network slice, a quality of service class identifier (QCI); and carrying, by the E2 node, in an E2 indication message, and transmitting to the RIC. In addition, the E2 indication message may be identified based on a detail information element of E2 indication transmitted from the RIC, and the information element information may include MESSAGE TYPE identifier information set based on a call processing function of the E2 node, RIC REQUEST ID identifier information, E2 NODE FUNCTION ID identifier information, RIC SUBSCRIPTION TYPE identifier information.

According to various example embodiments of the disclosure, a method of an E2 node includes: transmitting an indication message to a radio access network (RAN) intelligent controller (RIC). The indication message may include a measurement container. The measurement container may include at least one of: first measurement information of a digital unit (DU), the first measurement information including at least one of information of a physical resource block (PRB) usage for a standalone (SA) structure, and information of a PRB usage for a non-standalone (NSA) structure; second measurement information of a CU-CP including information regarding the number of active user equipments (UEs); and third measurement information including at least one of packet date convergence protocol (PDCP) usage information for the SA structure and PRB usage information for the NSA structure.

According to various example embodiments of the disclosure, an apparatus of an E2 node includes: at least one transceiver and at least one processor. The at least one processor may be configured to: control the at least one transceiver to transmit an indication message to a radio access network (RAN) intelligent controller (RIC). The indication message may include a measurement container. The measurement container may include at least one of: first measurement information of a digital unit (DU), the first measurement information including at least one of information of a physical resource block (PRB) usage for a standalone (SA) structure, and information of a PRB usage for a non-standalone (NSA) structure; second measurement information of a CU-CP including information regarding the number of active user equipments (UEs); and third measurement information including at least one of packet data convergence protocol (PDCP) usage information for the SA structure and PRB usage information for the NSA structure.

The apparatus and the method according to various example embodiments of the disclosure may enable to report measurement information to an RIC through a container for performance measurement in an indication message The advantages achieved in the disclosure is not limited to those mentioned above, and other effects that are not mentioned above may be clearly understood to those skilled in the art based on the description provided below.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 8, 9 and 10 are diagrams illustrating examples of messages used for a measurement container message transmission procedure based on an E2 indication according to various embodiments.

DETAILED DESCRIPTION

Figure 1:
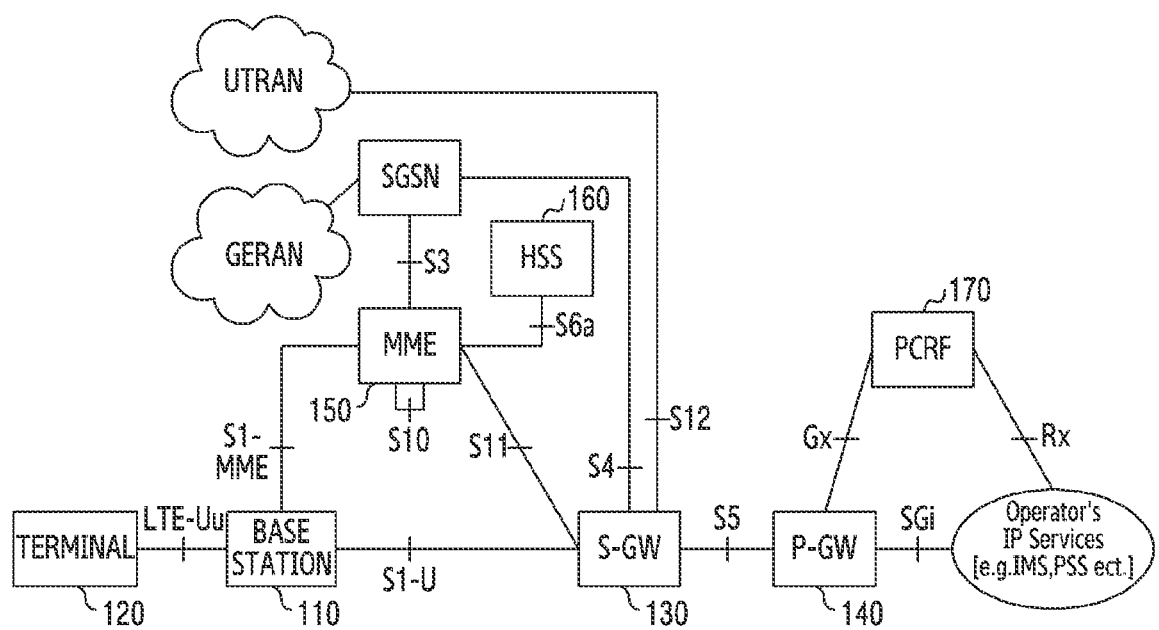
FIG. 1 is a diagram illustrating an example of a $4^{th}$ generation (4G) long term evolution (LTE) core system.

The terms used in the disclosure are used to describe various example embodiments and are not intended to limit the scope of the embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the disclosure, they should not be interpreted as excluding embodiments of the disclosure.

In various embodiments of the disclosure described below, hardware-wise approach methods will be described by way of an example. However, various embodiments of the disclosure include technology using both hardware and software, and thus do not exclude software-based approach methods.

The disclosure described hereinbelow relates to an apparatus and a method for performing a subscription procedure between a device within a radio access network (RAN) and a device for controlling the RAN in a wireless communication system.

As used herein, terms indicating signals, terms indicating channels, terms indicating control information, terms indicating network entities, terms indicating components of a device are merely examples for convenience of explanation. Accordingly, the disclosure is not limited to the terms described below, and other terms having the same or similar technical meanings may be used.

In addition, in the disclosure, the expression "exceeding" or "being less than" may be used to determine whether a specific condition is satisfied, fulfilled, but these are just for expressing one example and do not exclude the expression "being greater than or equal to" or "being less than or equal to." The condition described by "being greater than or equal to" may be substituted with "exceeding", the condition described by "being less than or equal to" may be substituted with "being less than", and the condition described by "being greater than or equal to and less than" may be substituted with "exceeding and being less than or equal to".

In addition, the disclosure describes various embodiments using terms used in some communication standards (for example, $3^{rd}$ generation partnership project (3GPP)), but these embodiments are merely examples. Various embodiments of the disclosure may be easily modified and applied to other communication systems.

As 4$^{th}$ generation (4G)/5$^{th}$ generation (5G) communication systems (for example, new radio (NR)) are commercialized, there is a demand for support of a differentiated service for a user in a virtualized network. To this end, the open radio access network (O-RAN) newly defined a radio unit (RU), a digital unit (DU), a central unit-control plane (CU-CP), a CU-user plane (CU-UP), which are nodes of a 3GPP network element (NE) and a base station, as an O-RAN (O)-RU, an O-DU, an O-CU-CP, an O-CU-UP, respectively, and additionally standardized a near-real-time (NRT) radio access network intelligent controller (RIC). The disclosure is to support an operator specific service model on an E2 interface through which the RIC requests a service from the O-DU, O-CU-CP or O-CU-UP. Herein, the O-RU, O-DU, O-CU-CP, O-CU-UP may be understood as entities of the RAN, which operate according to O-RAN standards, and may be referred to as an E2 node. An interface with entities of the RAN, which operate according to O-RAN standards between the RIC and the E2 nodes, uses an E2 application protocol (E2AP).

The RIC is a logical node that collects information on a cell site where a terminal and an O-DU, an O-CU-CP or an O-CU-UP transmit and receive data. The RIC may be implemented in the form of a server which is concentrically arranged in one physical place. A connection between the O-DU and the RIC, between the O-CU-CP and the RIC, between the O-CU-UP and the RIC may be established through Ethernet. To achieve this, interfaces standards are required for communication between the O-DU and the RIC, between the O-CU-CP and the RIC, between the O-CU-UP and the RIC, and message standards of E2-DU, E2-CU-CP, E2-CU-UP, etc. and definition of procedures between the O-DU, O-CU-CP, O-CU-UP and the RIC are required. In particular, support of a differentiated service for a user in a virtualized network is required, and a call processing message/function generated in the O-RAN is concentrated on the RIC, so that definition of functions of messages of the E2-DU, E2-CU-CP, E2-CU-CP for supporting a service for a wide cell coverage is required.

For example, the RIC may perform communication with the O-DU, O-CU-CP, O-CU-UP using the E2 interface, and may set an event occurrence condition by generating and transmitting a subscription message, and may transmit through an E2 indication/report. Control of the O-DU, O-CU-CP, O-CU-UP is provided using an E2 control message.

FIG. 1 is a diagram illustrating an example of a 4$^{th}$ generation (4G) long term evolution (LTE) core system.

Referring to FIG. 1, the LTE core system includes a base station 110, a terminal 120, a serving gateway (S-GW) 130, a packet data network gateway (P-GW) 140, a mobility management entity (MME) 150, a home subscriber server (HSS) 160, and a policy and charging rule function (PCRF) 170.

The base station 110 is a network infrastructure that provides radio access to the terminal 120. For example, the base station 110 is a device that collects state information of the terminal 110, such as a buffer state, available transport power, a channel state, etc., and performs scheduling. The base station 110 has a coverage that is defined as a predetermined geographical region based on a distance by which a signal is transmitted. The base station 110 is connected with the MME 150 through an S1-MME interface. The base station 110 may be referred to as 'access point (AP),' 'eNodeB (eNB),' 'wireless point,' 'transmission/reception point (TRP),' or other terms having the same or similar technical meaning as the above-mentioned terms, in addition to the base station.

The terminal 120 is a device that is used by a user and performs communication with the base station 110 through a wireless channel. According to circumstances, the terminal 120 may be operated without user's intervention. That is, at least one of the terminal 120 may be a device that performs machine type communication (MTC), and may not be carried by a user. The terminal 120 may be referred to as 'user equipment (UE),' 'mobile station,' 'subscriber station,' 'customer-premises equipment (CPE),' 'remote terminal,' 'wireless terminal,' or 'user device,' or other terms having the same or similar technical meaning as the above-mentioned terms, in addition to the terminal.

The S-GW 130 provides a data bearer and generates or controls a data bearer under control of the MME 150. For example, the S-GW 130 process a packet arriving from the base station 110 or a packet to forward to the base station 110. In addition, the S-GW 130 may perform an anchoring role during a handover between base stations of the terminal 120. The P-GW 140 may function as a connection point with an external network (for example, an Internet network). In addition, the P-GW 140 may allocate an Internet protocol (IP) address to the terminal 120, and may perform an anchoring role for the S-GW 130. In addition, the P-GW 140 may apply a quality of service (QoS) policy of the terminal 120, and may manage account data.

The MME 150 manages mobility of the terminal 120. In addition, the MME 150 may perform authentication, bearer management, etc. with respect to the terminal 120. That is, the MME 150 is in charge of mobility management for the terminal and various control functions. The MME 150 may interwork with a serving general packet radio service (GPRS) support node (SGSN).

The HSS 160 stores key information and a subscriber profile for authenticating the terminal 120. The key information and the subscriber profile may be transmitted from the HSS 160 to the MME 150 when the terminal 120 connects to a network.

The PCRF 170 defines rules regarding a policy and charging. Stored information may be transmitted to the P-GW 140 from the PCRF 170, and the P-GW 140 may perform control (for example, QoS management, charging, etc.) with respect to the terminal 120, based on the information provided from the PCRF 170.

Carrier aggregation (hereinafter, 'CA') technology refers to technology for increasing a frequency use efficiency from the viewpoint of a terminal or a base station, by combining a plurality of component carriers and letting one terminal transmit and receive signals using the plurality of component carriers simultaneously. For example, according to the CA technology, the terminal and the base station may exchange signals using a broadband using the plurality of component carriers in an uplink (UL) and a downlink (DL), and in this case, the respective component carriers may be positioned in different frequency bands. Hereinafter, the uplink refers to a communication link though which a terminal transmits a signal to a base station, and the downlink refers to a communication link through which a base station transmits a signal to a terminal. In this case, the number of uplink component carriers and the number of downlink component carriers may be different from each other.

Dual connectivity or multi connectivity refers to technology that increases a frequency use efficiency from the viewpoint of a terminal or a base station, by connecting one terminal to a plurality of different base stations and allowing the terminal to transmit and receive signals using carriers in the plurality of base stations positioned in different frequency bands simultaneously. The terminal may be connected to a first base station (for example, a base station providing a service using LTE or 4G mobile communication technology) and a second base station (for example, a base station providing a service using NR or 5G mobile communication technology), simultaneously, and may transmit and receive traffic. In this case, frequency resources that the respective base stations use may be positioned in different bands. An operating method based on double connectivity of LTE and NR described above may be referred to as 5G non-standalone (NSA).

Figure 2A:
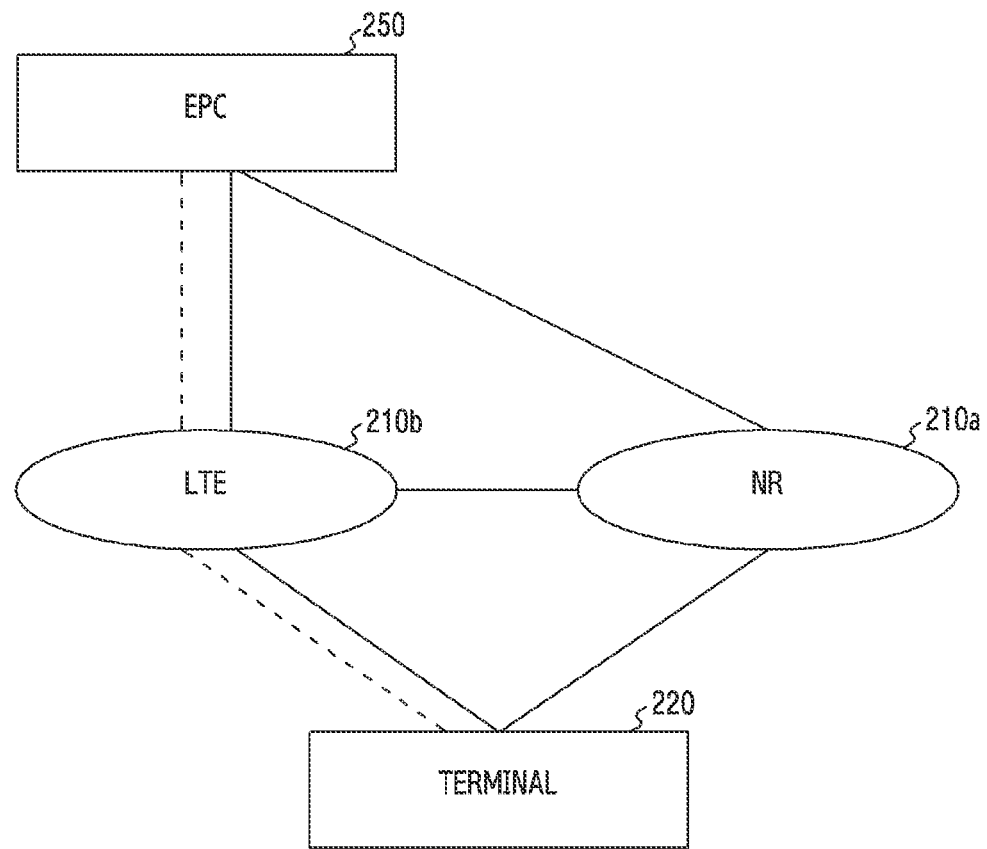
FIG. 2A is a diagram illustrating an example of a $5^{th}$ generation (5G) non-standard alone (NSA) system.

FIG. 2A is a diagram illustrating an example of a 5G NSA system.

Referring to FIG. 2A, the 5G NSA system includes an NR RAN 210a, an LTE RAN 210b, a terminal 220, and an evolved packet core (EPC) 250. The NR RAN 210a, the LTE RAN 210b may be connected to the EPC 250 and the terminal 220 may receive services from any one or both of the NR-RAN 210a, the LTE RAN 210B, simultaneously. The NR RAN 210a includes at least one NR base station, and the LTE RAN 210b includes at least one LTE base station. Herein, the NR base station may be referred to as '5$^{th}$ generation node (5G node),' 'next generation nodeB (gNB),' or other terms having the same or similar technical meaning as the above-mentioned terms. In addition, the NR base station may have a structure that is classified into a central unit (CU) and a digital unit (DU), and the CU may have a structure that is classified into a CU-control plane (CP) unit and a CU-user plane (UP) unit.

In the structure shown in FIG. 2A, the terminal 220 may perform radio resource control (RRC) connection through a first base station (for example, a base station belonging to the LTE RAN 210b), and may receive a service of a function provided on the control plane (for example, connectivity management, mobility management, etc.). In addition, the terminal 220 may receive additional radio resources for transmitting and receiving data through a second base station (for example, a base station belonging to the NR RAN 210a). The dual connectivity technology using LTE and NR may be referred to as evolved universal terrestrial radio access (E-UTRA)-NR dual connectivity (EN-DC). Similarly, dual connectivity technology in which the first base station uses NR technology and the second base station uses LTE technology is referred to as NR-E-UTRA dual connectivity (NE-DC). In addition, various embodiments may be applied to multi connectivity of various forms and carrier aggregation technology. In addition, various embodiments may be applied when a first system using a first communication technique and a second system using a second communication technique are implemented in one device, or when a first base station and a second base station are positioned on the same geographical position.

Figure 2B:
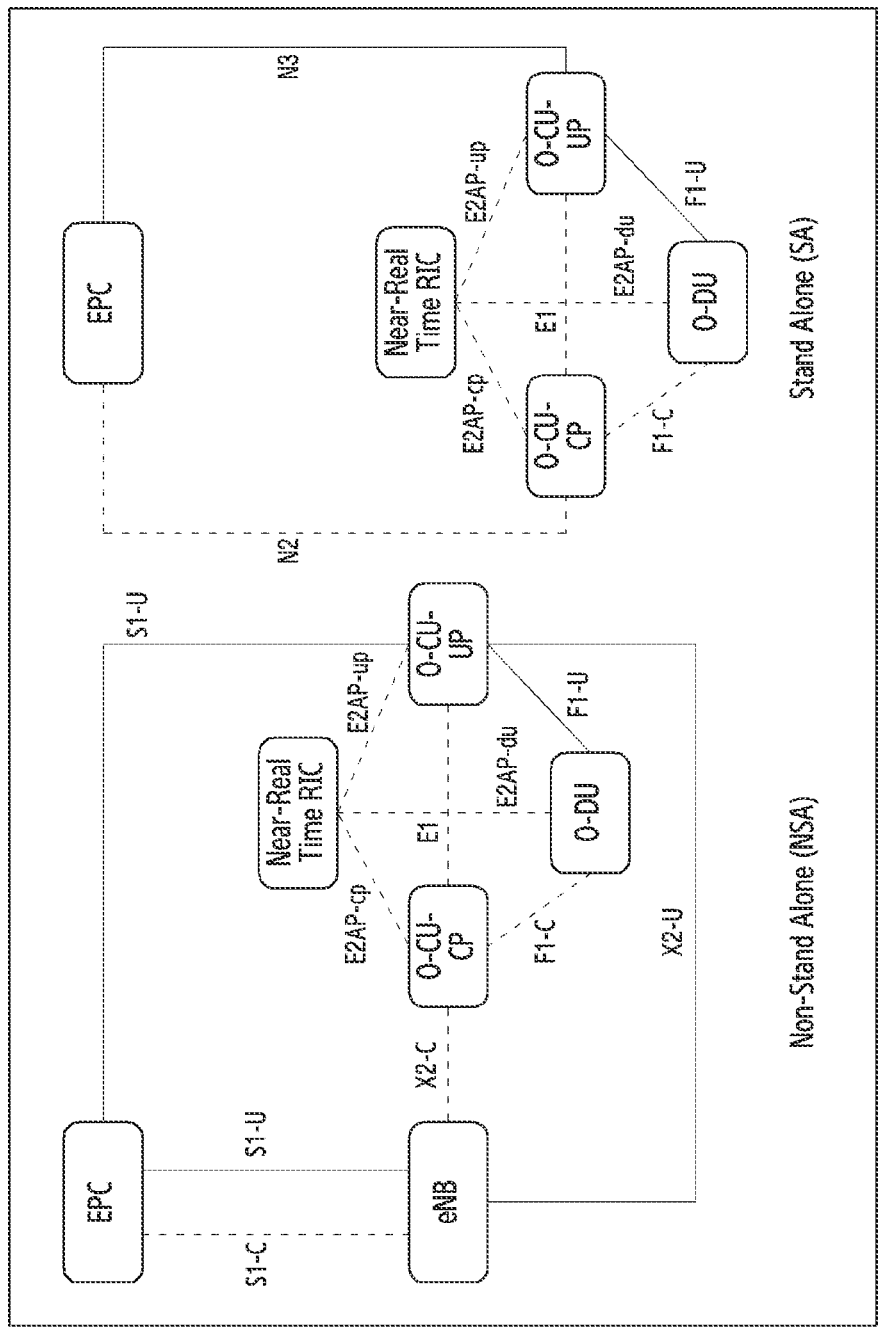
FIG. 2B is a diagram illustrating an example of an architecture for an O-RAN.

FIG. 2B is a diagram illustrating an example of an architecture for an O-RAN. For the purpose of E2-SM-key performance indicator (KPI) monitoring (KPIMON) of an E2 service model, an O-RAN non-stand alone mode within a multi-connectivity operation using E-UTRA and NR radio access technology may be considered, and it may be assumed that an E2 node is in an O-RAN stand alone mode.

Referring to FIG. 2B, in deployment of the O-RAN non-stand alone mode, an eNB is connected with an EPC through an S1-C/S1-U interface, and is connected with an O-CU-CP through an X2 interface. An O-CU-CP for deployment of the O-RAN stand alone mode may be connected with a 5G core (5GC) through an N2/N3 interface.

Figure 3:
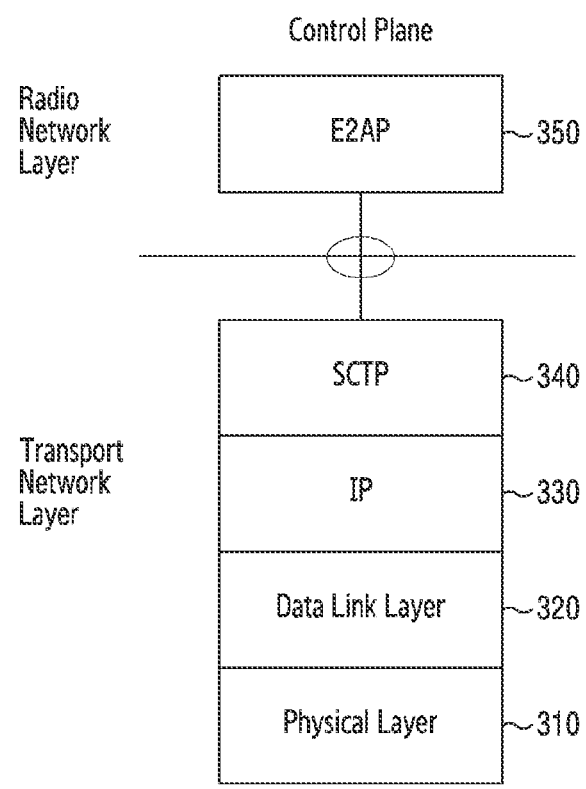
FIG. 3 is a diagram illustrating a protocol stack of an E2 application protocol message on a radio access network according to various embodiments.

FIG. 3 is a diagram illustrating an example protocol stack of an E2 application protocol message on a radio access network according to various embodiments. Referring to FIG. 3, a control plane includes a transport network layer and a radio network layer. The transport network layer includes a physical layer 310, a data link layer 320, an Internet protocol (IP) 330, and a stream control transmission protocol (SCTP) 340.

The radio network layer includes an E2AP 350. The E2AP 350 is used to transmit a subscription message, an indication message, a control message, a service update message, a service query message, and is transmitted on a higher layer of the SCTP 340 and the IP 330.

Figure 4:
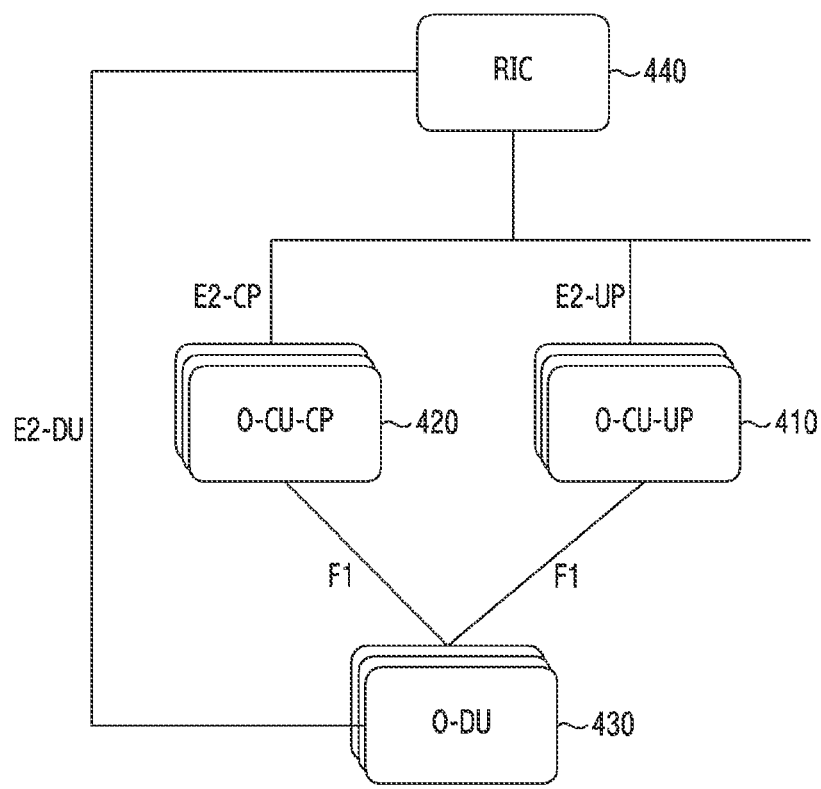
FIG. 4 is a diagram illustrating an example of a connection between a base station and a radio access network intelligence controller (RIC) on a radio access network according to various embodiments.

FIG. 4 is a diagram illustrating an example of connection between a base station and a radio access network intelligence controller (RIC) on a radio access network according to various embodiments.

Referring to FIG. 4, the RIC 440 is connected with an O-CU-CP 420, an O-CU-UP 410, and an O-DU 430. The RIC 440 may be a device for customizing RAN functionality for a new service or regional resource optimization. The RIC 440 may provide functions such as network intelligence (for example, policy enforcement, handover optimization), resource assurance (for example, radio-link management, advanced self-organized network (SON)), resource control (for example, load balancing, slicing policy), etc. The RIC 440 may perform communication with the O-CU-CP 420, the O-CU-UP 410, the O-DU 430. The RIC 440 may be connected with the respective nodes through E2-CP, E2-UP, E2-DU interfaces. In addition, an interface between the O-CU-CP and the DU, between the O-CU-UP and the DU may be referred to as an F1 interface. In the following description, the DU and the O-DU, the CU-CP and the O-CU-CP, the CU-UP and the O-CU-UP may be interchangeably used.

FIG. 4 illustrates one RIC 440, but according to various embodiments, there may be a plurality of RICs. The plurality of RICs may be implemented by a plurality of pieces of hardware positioned on the same physical position, or may be implemented through virtualization using one piece of hardware.

Figure 5:
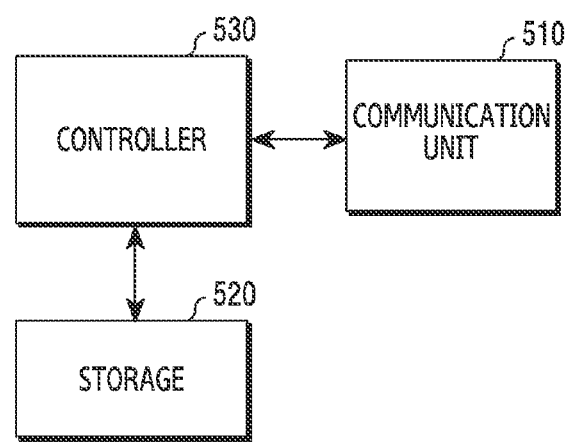
FIG. 5 is a block diagram illustrating an example configuration of a device on a radio access network according to various embodiments.

FIG. 5 is a block diagram illustrating an example configuration of a device according to various embodiments. The structure illustrated in FIG. 5 may be understood as an example configuration of a device having a function of at least one of an RIC, an O-CU-CP, an O-CU-UP, and an O-DU. The term "unit" or terms ending with suffixes "-er," and "-or" used in the following description refer to a unit processing at least one function or operation, and may be implemented by hardware, software, or a combination of hardware and software.

Referring to FIG. 5, a core network device may include a communication unit (e.g., including communication circuitry) 510, a storage 520, a controller (e.g., including processing circuitry) 530.

The communication unit 510 may include various communication circuitry and provides an interface for performing communication with other devices in a network. For example, the communication unit 510 converts a bit stream transmitted from the core network device to another device into a physical signal, and converts a physical signal received from another device to a bit stream. That is, the communication unit 510 may transmit and receive signals. Accordingly, the communication unit 510 may be referred to as a modem, a transmitter, a receiver, or a transceiver. In this case, the communication unit 510 enables the core network device to communicate with other devices or systems through backhaul connection (for example, wired backhaul or wireless backhaul) or a network.

The storage 520 may store data such as a basic program for operations of the core network device, an application, configuration information, or the like. The storage 520 may be configured by a volatile memory, a nonvolatile memory, or a combination of a volatile memory and a nonvolatile memory. In addition, the storage 520 provides stored data according to a request of the controller 530.

The controller 530 may include various processing and/or control circuitry and controls overall operations of the core network device. For example, the controller 530 may transmit and receive signals through the communication unit 510. In addition, the controller 530 may write and read out data on or from the storage 520. To achieve this, the controller 530 may include at least one processor. According to various embodiments, the controller 530 may control the device to perform operations according to various embodiments described in the disclosure.

Figure 6:
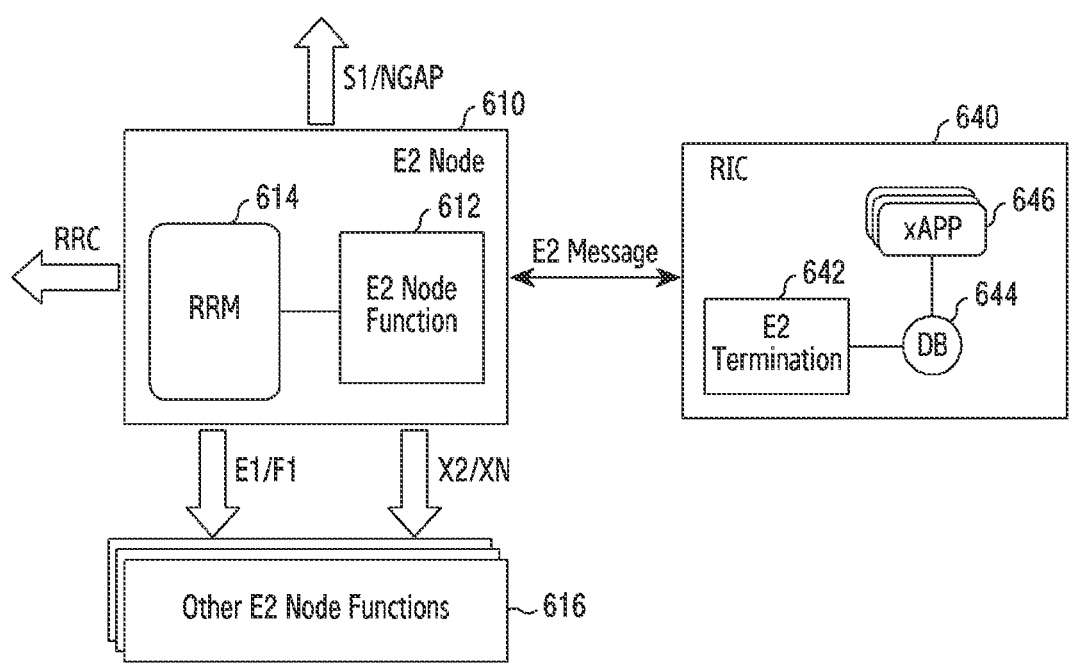
FIG. 6 is a diagram illustrating a logical function related to an E2 message of an E2 node and an RIC on a radio access network according to various embodiments.

FIG. 6 is a diagram illustrating example logical functions related to an E2 message of an E2 node and an RIC on a radio access network according to various embodiments.

Referring to FIG. 6, the RIC 640 and the E2 node 610 may transmit or receive an E2 message to or from each other. Further the E2 node 610 may communicate with other E2 node functions 616 using E1/F1 interface and/or X2/XN interface. For example, the E2 node 610 may be an O-CU-CP, an O-CU-UP, an O-DU, or a base station. The E2 node 610 may include an E2 node function 612 and radio resource management (RRM) function 614. The E2 node function 612 is a function corresponding to a specific xApp (application S/W) 646 installed in the RIC 640. For example, in the case of KPI monitoring, KPI monitoring collection S/W is installed in the RIC 640, and the E2 node 610 may include the E2 node function 612 which generates KPI parameters and then transmits an E2 message including the KPI parameters to an E2 termination function 642 positioned in the RIC 640. The E2 termination function 642 positioned in the RIC 640 is a termination of the RIC 640 regarding the E2 message, and performs a function of interpreting the E2 message transmitted by the E2 node 610 and then transmitting the same to the xApp 646. RIC 640 includes data base 644 connected with the E2 termination function 642 and the xApp 646. The E2 node 610 illustrated in FIG. 6 is a termination of at least one interface, and may be understood as a termination of messages transmitted to a terminal, a neighboring base station, a core network.

Figure 7:
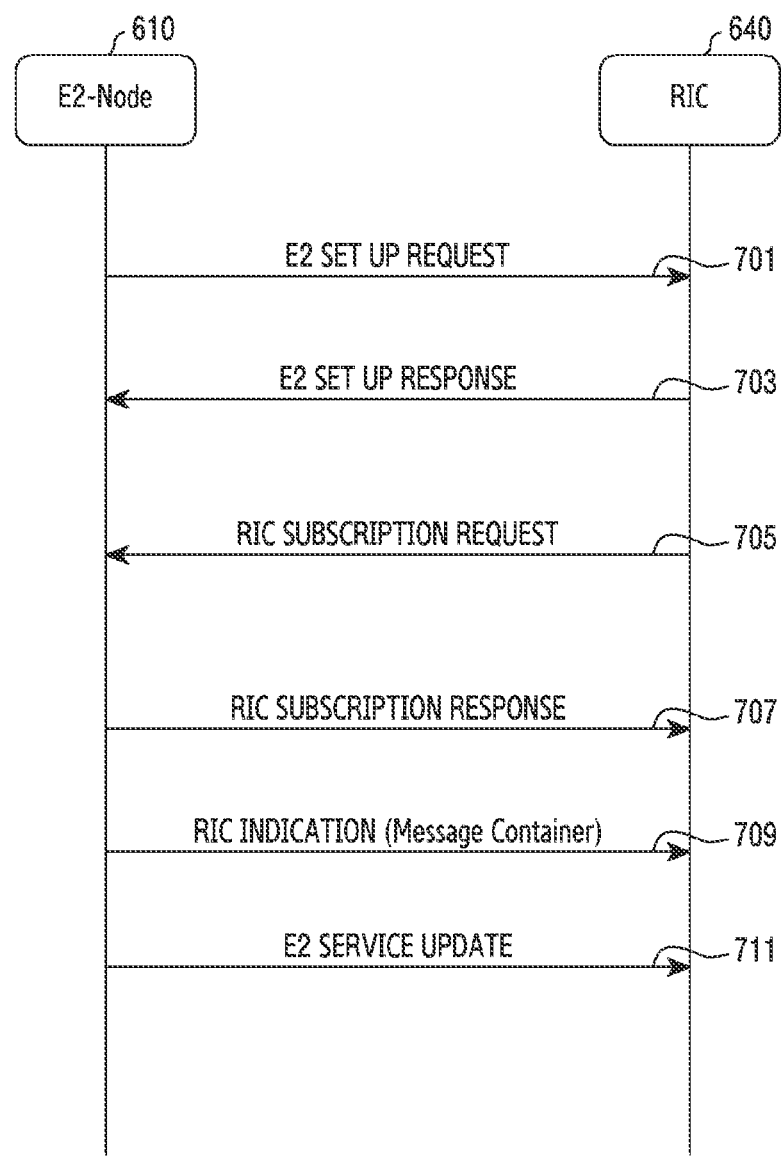
FIG. 7 is a signal flow diagram illustrating an example of a signaling procedure between an E2 node and an RIC according to various embodiments.

FIG. 7 is a signal flow diagram illustrating an example of a signaling procedure between an E2 node and an RIC according to various embodiments. For example, FIG. 7 illustrates a setup procedure of an E2 I/F and an RIC subscription message transmission procedure between the E2 node and the RIC.

Referring to FIG. 7, at operation 701, the E2 node may transmit an E2 setup request message to the RIC. An E2 NODE FUNCTION positioned in the E2 node may find the RIC using an RIC IP Address set by operations, administration and management (OAM), and may transmit the E2 SET UP REQUEST message. The E2 SET UP REQUEST message may include an RAN Function Definition which defines a function of the RAN supported by the E2 node, E2 NODE ID information, etc. An RAN Function Definition value is a value that is set by OAM, and the RIC may receive information on the value set by OAM and may determine what call processing function is supported by the E2 node, based on the RAN Function Definition value.

At operation 703, the RIC may transmit an E2 setup response message to the E2 node. The RIC may transmit the E2 SETUP RESPONSE message when the E2 SETUP REQUEST message transmitted by the E2 node is acceptable.

At operation 705, the RIC may transmit a subscription request message to the E2 node. A specific xApp positioned in the RIC may request an RIC E2 termination function to subscribe to a specific RAN Function Definition function supported in the E2. Herein, the subscription request message at operation 705 may be included in the E2 SETUP RESPONSE message of operation 703, and may be transmitted along therewith according to an embodiment, At operation 707, the E2 node may transmit a subscription request response to the RIC. The E2 Node Function of the E2 node may decode the Subscription Request Message, and may successfully set an event condition that is requested from the E2 node function by the RIC, and then, may transmit, to the RIC, a message indicating that an event trigger condition is successfully set, as a subscription response.

At operation 709, the E2 node may transmit an E2 RIC indication message to the RIC. When a specific event condition occurs, the E2 node may transmit the E2 RIC Indication message to the RIC.

At operation 711, the E2 node may transmit a service update message to the RIC. When a change occurs in the E2 NODE function capability Information element (RAN Function Definition), the E2 node may transmit the RAN Function Definition changed by the E2 SERVICE UPDATE to the RIC.

In FIG. 7, the SET UP procedure, the RIC subscription procedure, the RIC Indication procedure, the update message transmission procedure are illustrated in sequence, but various embodiments of the disclosure are not limited to the above-described order, procedure. For example, in various embodiments, the E2 node and the RIC may independently perform the E2 setup procedure of operations 701 to 703. In various embodiments, the E2 node and the RIC may independently perform the subscription procedure of operations 705 to 707. In another embodiment, the E2 setup response message may include the subscription request message as described above. In various embodiments, the E2 node and the RIC may independently perform the RIC indication procedure of operation 709. In addition, the E2 node and the RIC may perform at least part of the above-described procedures all together or individually.

Following Table illustrates information elements (IEs) of an E2 Indication message:

TABLE 1

| IE/Group Name | Presence | Range | IE type and reference | Semantics description | Criticality | Assigned Criticality |
|---|---|---|---|---|---|---|
| Message Type | M | | 9.2.3 | | YES | reject |
| RIC Request ID | M | | 9.2.7 | | YES | reject |

TABLE 1-continued

| IE/Group Name | Presence | Range | IE type and reference | Semantics description | Criticality | Assigned Criticality |
|---|---|---|---|---|---|---|
| RAN Function ID | M | | 9.2.8 | | YES | reject |
| RIC Action ID | M | | 9.2.10 | | YES | reject |
| RIC Indication SN | O | | 9.2.14 | | YES | reject |
| RIC Indication Type | M | | 9.2.15 | | YES | reject |
| RIC Indication Header | M | | 9.2.17 | | YES | reject |
| RIC Indication message | M | | 9.2.16 | | YES | reject |
| RIC Call process ID | O | | 9.2.18 | | YES | reject |

The first IE is a Message Type, and has a unique value according to each E2 message. The second IE is an RIC REQUEST ID and designates a specific xApp. The third IE is an E2 NODE FUNCTION ID and is an identifier for identifying whether the E2 node is an eNB, an O-DU, an O-CU-CP, or an O-CU-UP. The fourth IE is an identifier for identifying an Action when an additional action of the RIC occurs. The fifth IE is a Sequence Number for guaranteeing a sequential action when an additional action of the RIC occurs. The sixth IE is an RIC INDICATION TYPE, and designates whether INDICATION occurrence in the E2 node is a REPORT of a specific process or is an addition to a message of an existing process.

The seventh identifier is a Header of the RIC INDICATION message suggested in the disclosure, and details of the Message are illustrated in following Table:

TABLE 2

| IE/Group Name | Presence | Range | IE type and reference | Semantics description |
|---|---|---|---|---|
| RIC TYPE ID | M | 1 ... <maxofType> | 8.3.5 | |
| E2 Node ID | O | | 8.3.11 | |
| Cell Global ID | O | | NR CGI | |
| PLMN ID | O | | Served PLMN information | |
| Slice ID | O | | S-NSSAI | |
| 5QI | O | | INTEGER (0 ... 255, ... ) | 5QI value |
| QCI | O | | INTEGER (0 ... 255, ... ) | QCI value |

The RIC Type ID is a type of the message and only one type is defined in the current standards. The E2 Node ID defines the E2 node performing Indication. In the current standards, Global gNB ID, gNB-CU-UP, gNB-DU ID, Global en-gNB ID, Global ng-eNB ID, global eNB ID are defined. The Cell Global ID is information of a cell which collects measurement, and the PLMN ID is an ID of an operator which collects measurement. The Slice ID is an ID of a Slice when the E2 node supports Stand Alone, and the 5G QoS indicator (5QI) is an ID that defines QoS when the E2 node supports a stand alone mode. The QoS Class Identifier (QCI) is a quality of service (QoS) ID that is limitedly used when the E2 node supports a non-stand alone mode.

The eighth identifier is an RIC indication message, and may include container details of a Measurement report suggested in the disclosure. The RIC indication message may be configured as shown in following Table. For example, the RIC may be a NEAR-RT RIC.

TABLE 3

| IE/Group Name | Presence | Range | IE type and reference | Semantics description |
|---|---|---|---|---|
| RIC TYPE ID | M | | 8.3.5 | |
| Performance Measurement Container | O | | 8.3.21 | |
| RAN Container | O | | 8.3.27 | |

Figure 8:
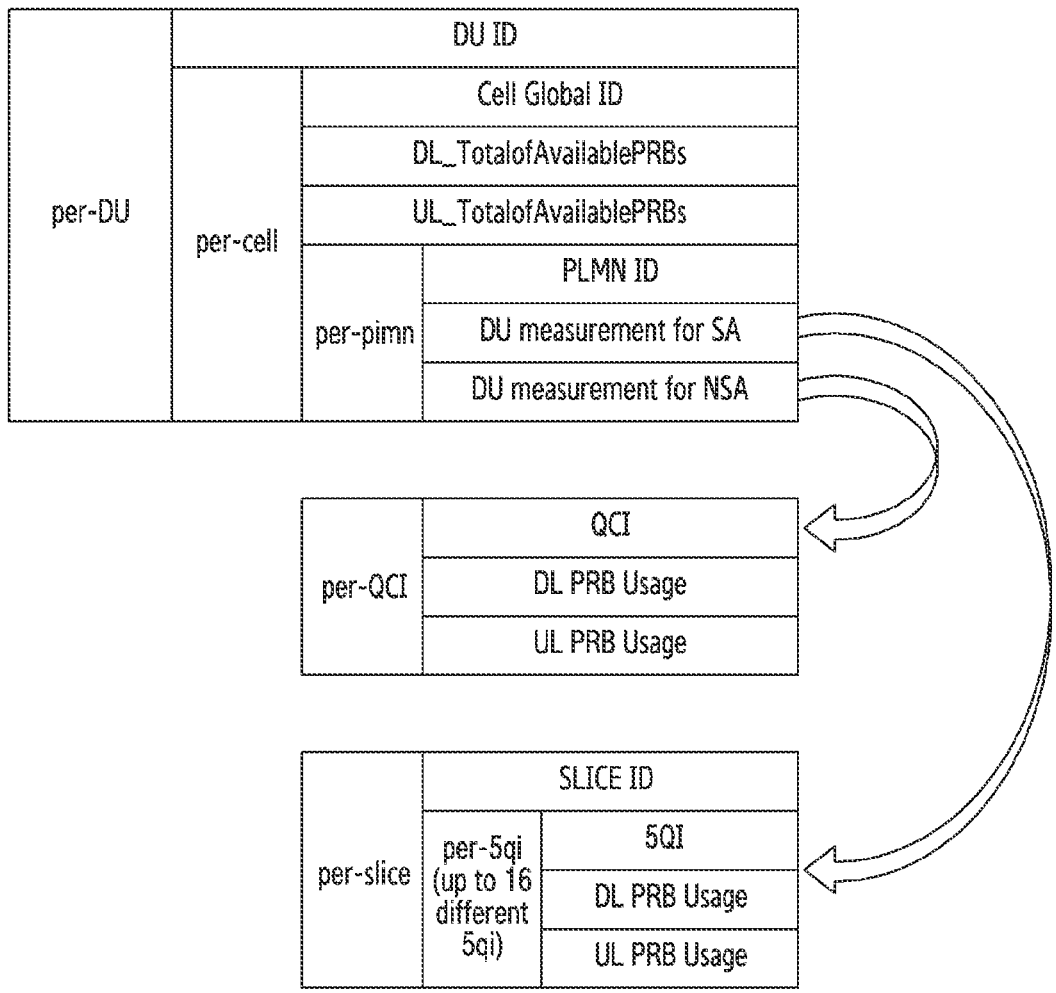
Figure 9:
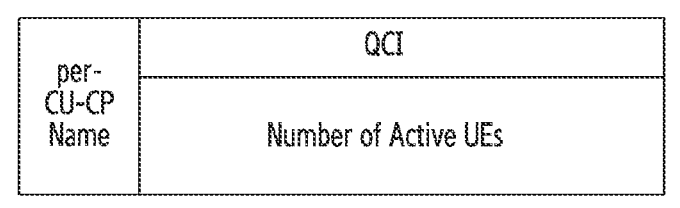

According to various embodiments, the RIC indication message may include an RIC type. In addition, the RIC indication message may include Container details (for example, performance measurement container). FIG. 8 illustrates container details transmitted through an indication message in the O-DU, FIG. 9 illustrates container details transmitted through an indication message in the O-CU-CP, and FIG. 9 illustrates container details transmitted through AN indication message in the O-CU-UP.

The ninth identifier is an RIC Call process ID and is an identifier by which the E2 node and the RIC mutually identifies an action of a specific event.

As described above, the E2 node may carry the container related to performance measurement in the RIC indication message, and may transmit the RIC indication message to the RIC. The RIC indication message according to various embodiments may include a container of a format which is determined according to a type of the E2 node (for example, O-DU, O-CU-UP, O-CU-CP). Hereinafter, containers of the O-DU, O-CU-UP, O-CU-CP will be described in greater detail below with reference to FIGS. 8, 9 and 10, respectively.

FIG. 8 is a diagram illustrating an example of a container transmitted from the O-DU to the RIC according to various embodiments. Through FIG. 8, a message container carried in the E2 indication message and transmitted from the O-DU to the RIC among the E2 message containers suggested in the disclosure is described.

Referring to FIG. 8, the message may include a DU ID. The message structure has the DU-ID on the uppermost layer. The DU ID indicates a specific DU. There is a Cell global ID under the DU ID, such that the E2 node (DU) reports information regarding a specific cell to the RIC through the message per DU. The information regarding the specific cell may include information regarding downlink available PRBs (for example, the number of DL total available PRBs), and information regarding downlink available PRBs (for example, the number of UL total available PRBs). The available PRB may refer to the total number of PRBs which are available during a reported E2 period. The message structure shown in FIG. 8 enables the E2-node to measure the number of downlink, uplink total available physical resource blocks (PRBs) per cell, and to report the measurement to the RIC. There is a public land mobile network (PLMN) ID as a lower factor thereof, which enables measurement of each specific operator PLMN. Measurement is enabled according to whether the E2-node structure is a stand alone structure or a non-standalone structure, and measurement information per PLMN may be classified into measurement information for the stand alone structure, measurement information for the non-standalone structure.

The measurement information for the stand alone structure may be classified based on a slice and a 5G QoS Indicator (5QI) which are defined in the 5G core network, and may include a downlink PRB usage and an uplink PRB usage. The downlink PRB usage and the uplink PRB usage may be reported to the RIC through the measurement information for the stand alone structure. In the example message structure, the measurement information for the stand alone structure may include a Slice ID and may be managed per Slice. The Slice ID may include a 5QI. The measurement information for the stand alone structure may include information regarding the downlink PRB usage and information regarding the uplink PRB usage per 5QI.

The measurement information regarding the non-stand alone structure may be classified based on a QCI identifier defined in a 4G EPC network, and may include a downlink PRB usage and an uplink PRB usage. Through the measurement information for the non-stand alone structure, the downlink PRB usage and the uplink PRB usage may be measured and may be reported to the RIC. In the example message structure, the measurement information for the non-stand alone structure may include a QCI and may be managed per QCI. The measurement information for the stand alone structure may include information regarding the downlink PRB usage and information regarding the uplink PRB usage per QCI.

For example, the message of FIG. 8 may be configured as shown in following Tables:

TABLE 4

| IE/Group Name | Presence | Range | IE type and reference | Semantics description |
|---|---|---|---|---|
| CellResourceReportList | | 1 | | |
| >CellResourceReportItem | | 1 ... <maxCellingNBDU(=512)> | | |
| >>Cell Global ID | M | | Refer to Cell Global ID definition in NGAP/XnAP | NR CGI |
| >>DL_TotalofAvailablePRBs | O | | INTEGER(0 ... 1,000,000,000, ... ) | The total number of physical resource blocks (PRBs) in average available downlink during reported E2 period |
| >>UL_TotalofAvailablePRBs | O | | INTEGER(0 ... 1,000,000,000, ... ) | The total number of physical resource blocks (PRBs) available uplink. during reported E2 period |
| >>ServedPlmnPerCellList | | 1 | | |
| >>>ServedPlmnPerCellListItem | | 1 ... <maxnoofBPLMNs(=6)> | | |
| >>>>PLMN Identity | M | | Refer to PLMN ID definition in NGAP/XnAP | Served PLMN information |
| >>>>DUMeasurementFormatForSA | O | | 8.3.22 (표 5) | Used for SA traffic |
| >>>>DUMeasurementFormatForNSA | O | | 8.3.23 (표 6) | Used for NSA traffic |
| SlicesPerPlmnPerCellList | | 1 | | |
| >SlicesPerPlmnPerCellListItem | | 1 ... <maxnoofSliceList(=100)> | | |
| >>SliceID | M | | | S-NSSAI |
| >>5QIPerSlicesPerPlmnPerCellList | | 1 | | |
| >>>5QIPerSlicesPerPlmnPerCellListItem | | 1 ... <maxnoofQoSFlows(=64)> | | Bounded by Max QoSFlows in a PDU session |
| >>>>5QI | M | | INTEGER (0 ... 255, ... ) | 5QI value |
| >>>DL_PRBUsage | O | | INTEGER(0 ... 1,000,000,000, ... ) | Used number of PRBs in average of DL for the monitored slice during reported E2 period |
| >>>>UL_PRBUsage | O | | INTEGER(0 ... 1,000,000,000, ... ) | Used number of PRBs in average of UL for the monitored slice during reported E2 period |

TABLE 6

| IE/Group Name | Presence | Range | IE type and reference | Semantics description |
|---|---|---|---|---|
| PerQciReportList | | 1 | | |
| >PerQciReportListItem | | 1 ... <maxnoofQCI(=256)> | | |
| >>QCI | M | | INTEGER (0 ... 255, ... ) | QCI value |
| >>DL_PRBUsage | O | | INTEGER(0 ... 1,000,000,000, ... ) | Used number of PRBs in average of DL for the monitored slice during reported E2 period |
| >>UL_PRBUsage | O | | INTEGER(0 ... 1,000,000,000, ... ) | Used number of PRBs in average of UL for the monitored slice during reported E2 period |

In the embodiments of FIG. 8, the E2 node may transmit at least one of the measurement information for the non-standalone (NSA) structure or the measurement information for the standalone (SA) structure to the RIC through the indication message. Herein, the measurement information may be measurement information related to a specific DU. That is, the DU may include measurement information for a lower area (cell, PLMN) of the DU. The measurement information for the NSA structure may include a PRB usage (DL PRB usage or UL PRB usage) which is measured based on the QCI, and the measurement information for the SA structure may include a PRB usage (DL PRB usage or UL PRB usage) which is measured based on the 5QI. Descriptions provided through tables 4 to 6 are merely example formats, and are not used to limitedly interpret embodiments of the disclosure.

FIG. 9 is a diagram illustrating an example of a container transmitted from the O-CU-CP to the RIC according to various embodiments. Through FIG. 9, a message container carried in the E2 indication message and transmitted from the O-CU-CP to the RIC among the E2 message containers suggested in the disclosure is described.

Referring to FIG. 9, the message may include a CU-CP name. The message structure may have the name of the CU-CP on the uppermost layer. The number of user equipments (UEs) which operate in an active state is defined according to the designated CU-CP name. For example, the average number of UEs during a monitoring period may be the number of active terminals. For example, the message of FIG. 9 may be configured as shown in following Table:

the number of active terminals may be measurement information related to the CU. Descriptions provided through Table 7 are merely example formats, and are not used to limitedly interpret embodiments of the disclosure.

Figure 10:
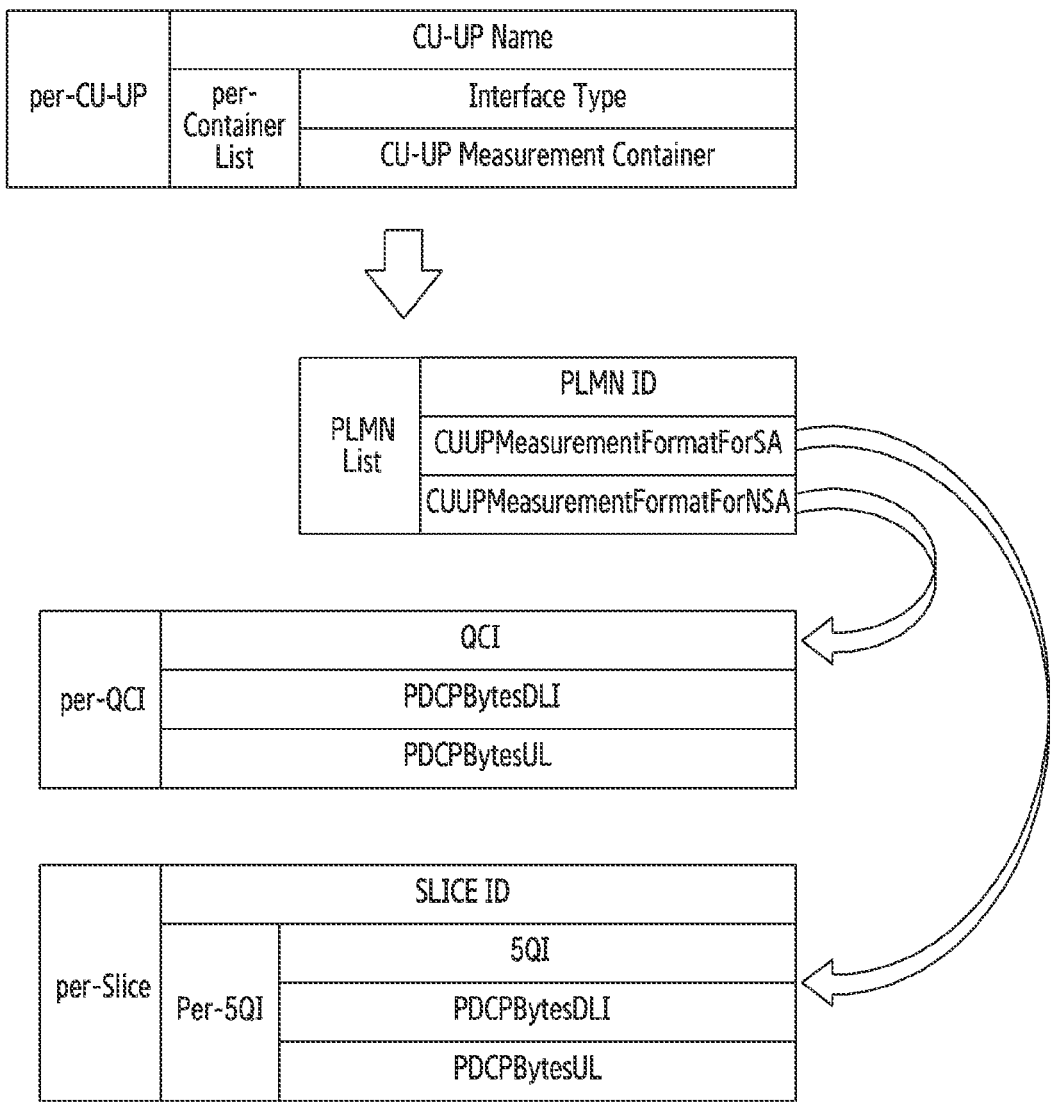

FIG. 10 is a diagram illustrating an example of a container which is transmitted from the O-CU-UP to the RIC according to various embodiments. Through FIG. 10, a message container which is carried in the E2 indication message and is transmitted from the O-CU-UP to the RIC among the E2 message containers suggested in the disclosure is described.

Referring to FIG. 10, the message may include a CU-UP name. The message structure may have the CU-UP name on the uppermost layer. The CU-UP name indicates a specific CU-UP and there exists an Interface Type under the CU-UP name, and accordingly, the message may indicate a specific I/F. Measurement may be performed according to a designated I/F. For example, the designated I/F may include X2, XN, F1-U, etc. The message may include a measurement container corresponding to the designated I/F. For example, the measurement container may be referred to as a CP-UP measurement container.

The specific I/F may include a public land mobile network (PLMN) ID as a lower identifier. Through the PLMN ID, the measurement may be performed according to a stand alone structure and a non-standalone structure per specific operator PLMN. That is, the measurement information that the CU-UP reports to the RIC may include measurement information for the stand alone structure and measurement information for the non-standalone structure.

TABLE 7

| IE/Group Name | Presence | Range | IE type and reference | Semantics description | Criticality | Assigned Criticality |
|---|---|---|---|---|---|---|
| CU-CP Name | O | | | CU-CP Name | — | — |
| CU-CP Resource Status | | 1 | | | YES | reject |
| >Number of Active UEs [FFS] | O | | INTEGER (1 ... 65536 ... ) | number of average UEs during the monitoring period | YES | |

In the embodiments of FIG. 9, the E2 node may transmit the number of active terminals to the RIC through the indication message. Herein, the E2 node is the CU-CP, and The measurement information for the stand alone structure may be classified based on a Slice and a 5QI structure which are defined in the 5G core network. For example, the measurement information for the stand alone structure may include a Slice ID and a 5QI of the Slice ID. The measurement information for the stand alone structure may include information regarding a downlink total packet data convergence protocol (PDCP) usage and information regarding a uplink total PDCP usage on the 5QI. Accordingly, the downlink total PDCP usage and the uplink total PDCP usage may be reported to the RIC.

The measurement information regarding the non-stand alone structure may be classified based on a QCI which is defined in the 4G EPC network, and a downlink total PDCP usage and a uplink total PDCP usage may be reported according to the QCI. For example, the measurement information for the non-stand alone structure may include the QCI. The measurement information for the non-stand alone structure may include information regarding the downlink total PDCP usage and the uplink total PDCP usage per QCI.

For example, the message of FIG. 10 may be configured as shown in following Tables:

TABLE 8

| IE/Group Name | Presence | Range | IE type and reference | Semantics description | Criticality | Assigned Criticality |
|---|---|---|---|---|---|---|
| CU-UP Name | O | | | CU-UP Name to distinguish CU-UP within a gNB | — | — |
| Container List | | 1 | | | | |
| >ContainerListItem | | 1 ... 3 | | | YES | reject |
| >>InterfaceType | M | | ENUMERATED (F1U, Xn, X2 ...) | | YES | reject |
| >>CUUPMeasurementContainer | M | | 8.3.24 (H 9) | | | |

TABLE 9

| IE/Group Name | Presence | Range | IE type and reference | Semantics description | Criticality | Assigned Criticality |
|---|---|---|---|---|---|---|
| PlmnList | | 1 | | | YES | reject |
| >PlmnListItem | | 1 ... 6 | | | — | |
| >>PLMN Identity | M | | Refer to PLMN ID definition in NGAP/XnAP | Served PLMN information | YES | reject |
| >>CUUPMeasurementFormatForSA | O | | 8.3.25 (H 10) | Used for SA traffic (i.e., F1U or Xn) | — | — |
| >>CUUPMeasurementFormatForNSA | O | | 8.3.26 (H 11) | Used for NSA traffic (i.e., F1U or X2) | — | — |

TABLE 10

| IE/Group Name | Presence | Range | IE type and reference | Semantics description | Criticality | Assigned Criticality |
|---|---|---|---|---|---|---|
| SlicesToReportList | | | | | | |
| >SlicesToReportListItem | | 1 ... <maxnoofSliceList(=16)> | | | — | |
| >>SliceID | M | | | S-NSSAI | YES | reject |
| >>5QIPerSlicesPerPlmnList | | 1 | | | YES | reject |
| >>>5QIPerSlicesPerPlmnListItem | | 1 ... <maxnoofQoSFlows (=64)> | | Bounded by Max QoSFlows in a PDU session | — | |
| >>>>5QI | M | | INTEGER (0 ... 255, ...) | 5QI value | YES | reject |

TABLE 10-continued

| IE/Group Name | Presence | Range | IE type and reference | Semantics description | Criticality | Assigned Criticality |
|---|---|---|---|---|---|---|
| >>>>PDCPBytesDL | O | | INTEGER (0 . . . 10, 000, 000, 000, . . . ) | total PDCP bytes transmitted DL during the report period (kbytes) | — | |
| >>>>PDCPBytesUL | O | | INTEGER (0 . . . 10, 000, 000, 000, . . . ) | total PDCP bytes transmitted UL during the report period (kbytes) | — | |

TABLE 11

| IE/Group Name | Presence | Range | IE type and reference | Semantics description | Criticality | Assigned Criticality |
|---|---|---|---|---|---|---|
| PerQciReportList | | 1 | | | YES | reject |
| >PerQciReportListItem | | 1 . . . <maxnoofQCI (=256)> | | | — | |
| >>QCI | M | | INTEGER (0 . . . 255, . . . ) | QCI value | YES | reject |
| >>PDCPBytesDL | O | | INTEGER (0 . . . 10, 000, 000, 000, . . . ) | total PDCP bytes transmitted DL during the report period (kbytes) | — | |
| >>PDCPBytesUL | O | | INTEGER (0 . . . 10, 000, 000, 000, . . . ) | total PDCP bytes transmitted UL during the report period (kbytes) | — | |

In the embodiments of FIG. 10, the E2 node may transmit at least one of the measurement information for the non-standalone (NSA) structure or the measurement information for the standalone (SA) structure to the RIC through the indication message. The measurement information may be measurement information related to the CU-UP. The measurement information for the NSA structure may include information regarding a PDCP transfer amount (for example, bytes) which is measured based on the QCI, and the measurement information for the SA structure may include information regarding a PDCP transfer amount (for example, bytes) which is measured based on the 5QI. Descriptions provided through tables 8 to 11 are merely example formats and are not used to limitedly interpret embodiments of the disclosure.

According to various example embodiments of the disclosure, a method of an E2 node may include: transmitting an indication message to a radio access network (RAN) intelligent controller (RIC). The indication message may include a measurement container. The measurement container may include at least one of: first measurement information of a digital unit (DU), the first measurement information including at least one of information of a physical resource block (PRB) usage for a standalone (SA) structure, and information of a PRB usage for a non-standalone (NSA) structure; second measurement information of a central unit control plane (CU-CP) including information regarding the number of active user equipments (UEs); and third measurement information including at least one of packet data convergence protocol (PDCP) usage information for the SA structure and PRB usage information for the NSA structure.

According to various example embodiments of the disclosure, an apparatus of an E2 node may include: at least one transceiver and at least one processor. The at least one processor may be configured to: control the at least one transceiver to transmit an indication message to a radio access network (RAN) intelligent controller (RIC). The indication message may include a measurement container. The measurement container may include at least one of: first measurement information of a digital unit (DU), the first measurement information including at least one of information of a physical resource block (PRB) usage for a standalone (SA) structure, and information of a PRB usage for a non-standalone (NSA) structure; second measurement information of a central unit control plane (CU-CP) including information regarding the number of active user equipments (UEs); and third measurement information including at least one of PDCP usage information for the SA structure and PRB usage information for the NSA structure.

According to various example embodiments of the disclosure, a method performed by an E2 node may include: generating a radio access network (RAN) intelligent controller (RIC) indication message including performance measurement information related to a digital unit (DU); and transmitting the RIC indication message to an RIC through an E2 interface, and the performance measurement information related to the DU may include measurement information for one or more public land mobile networks (PLMNs), and the measurement information may include, regarding each PLMN: a PLMN identifier (ID); and at least one of 5$^{th}$ generation core (5GC)-based DU measurement information or evolved packet core (EPC)-based DU measurement information.

According to various example embodiments of the disclosure, a method performed by a radio access network (RAN) intelligent controller (RIC) may include: receiving, from an E2 node through an E2 interface, an RIC indication message including performance measurement information related to a digital unit (DU), and the performance measurement information related to the DU may include measurement information for one or more public land mobile networks (PLMNs), and the measurement information may include, regarding each PLMN: a PLMN identifier (ID); and at least one of 5$^{th}$ generation core (5GC)-based DU measurement information or evolved packet core (EPC)-based DU measurement information.

According to various example embodiments of the disclosure, an apparatus for an E2 node may include: at least one processor; and at least one transceiver, and the at least one processor may be configured to: generate a radio access network (RAN) intelligent controller (RIC) indication message including performance measurement information related to a digital unit (DU); and control the transceiver to transmit the RIC indication message to an RIC through an E2 interface, and the performance measurement information related to the DU may include measurement information for one or more public land mobile networks (PLMNs), and the measurement information may include, regarding each PLMN: a PLMN identifier (ID); and at least one of 5$^{th}$ generation core (5GC)-based DU measurement information or evolved packet core (EPC)-based DU measurement information.

According to various example embodiments of the disclosure, an apparatus for a radio access network (RAN) intelligent controller (RIC) may include: at least one processor; and at least one transceiver, and the at least one processor may be configured to receive, from an E2 node through an E2 interface, an RIC indication message including performance measurement information related to a digital unit (DU), the performance measurement information related to the DU may include measurement information for one or more public land mobile networks (PLMNs), and the measurement information may include, regarding each PLMN: a PLMN identifier (ID); and at least one of 5$^{th}$ generation core (5GC)-based DU measurement information or evolved packet core (EPC)-based DU measurement information.

According to an example embodiment, the 5GC-based DU measurement information may include, regarding each slice: a slice ID; and usage information for one or more 5G QoS identifiers (5QI), and the usage information may include, regarding each 5QI; a 5QI; and at least one of a downlink physical resource block (PRB) usage or an uplink PRB usage.

According to an example embodiment, the EPC-based DU measurement information may include, regarding each quality of service (QoS) class identifier (QCI): a QCI ID; and at least one of a downlink physical resource block (PRB) usage or an uplink PRB usage.

According to an example embodiment, the performance measurement information related to the DU may include at least one of information regarding downlink available PRBs or information regarding uplink available PRBs, and the downlink available PRBs may refer to whole PRBs of a downlink which are available during a reported E2 period, and the uplink available PRBs may refer to whole PRBs of an uplink which are available during the reported E2 period.

According to an example embodiment, the RIC indication message may include performance measurement information related to a central unit (CU)-control plane (CP), and the performance measurement information related to the CU-CP may include information regarding a number of active UEs.

According to an example embodiment, the RIC indication message may include performance measurement information related to a central unit (CU)-user plane (UP), and the performance measurement information related to the CU-UP may include at least one of 5GC-based CU measurement information or EPC-based CU measurement information.

According to an example embodiment, the 5GC-based CU measurement information may include, regarding each slice: a slice ID; and usage information for one or more 5G QoS identifiers (5QIs), and the usage information may include, regarding each 5QI; a 5QI; and at least one of a downlink packet data convergence protocol (PDCP) data size or an uplink PDCP data size.

According to an example embodiment, the EPC-based CU measurement information may include, regarding each quality of service (QoS) class identifier (QCI): a QCI ID; and at least one of a downlink packet data convergence protocol (PDCP) data size or an uplink PDCP data size.

According to an example embodiment, the RIC may be a near real time (RT) RIC, and the E2 node may include an O-RAN distributed unit (O-DU), an O-RAN central unit-control plane (O-CU-CP), an O-RAN central unit-user plane (O-CU-UP), or an O-RAN eNodeB (O-eNB).

Through FIGS. 8, 9 and 10, the message that the DU reports to the RIC or the CU reports to the RIC has been described. The message may include measurement information of an RAN area (for example, per cell) and measurement information of a higher layer (for example, a PDCP), and may have a different type according to whether a 5G architecture is a standalone (SA) structure or a non-standalone (NSA) structure.

As described above, the disclosure provides an apparatus and a method for an E2 node to transmit measurement information to a radio access network (RAN) intelligent controller (RIC) in a wireless communication system, based on message IEs. There are provided an apparatus and a method for transmitting measurement information according to a type of the E2 node, that is, a distributed unit (DU), a central unit (CU)-control plane (CP), a central unit (CU)-user plane (UP). In addition, the E2 node according to various embodiments may configure measurement information based on a quality identifier (for example, at least one of QCI, 5QI, Slice ID) which is determined according to whether the message structure is the standalone (SA) structure or the non-standalone (NSA) structure, and may transmit the measurement information to the RIC.

It is illustrated that the message structure included in the container includes both information regarding the standalone (SA) structure and information regarding the non-standalone (NSA) structure, but this may refer, for example, to the message including different types of fields and does not mean that two pieces of information should be necessarily included. According to an embodiment, the indication message of FIG. 8 may include information regarding a DL/UL PRB usage per 5QI for the SA structure. In addition, according to another embodiment, the indication message of FIG. 8 may include information regarding a DL/UL PRB usage per QCI for the NSA structure. Likewise, the indication message of FIG. 10 according to an embodiment may include information regarding a PDCP transfer amount per 5QI for the SA structure. In addition, the indication message of FIG. 8 according to another embodiment may include information regarding a PDCP transfer amount per QCI for the NSA structure.

Through various embodiments of the disclosure, an event condition may be set for a call processing function of an E2 node through an E2 SUBSCRIPTION message, and at least one of cell measurement per E2 node, PDCP measurement per I/F, measurement of the number of active UEs may be periodically packed in a container, and may be transmitted to the RIC. Through this, a call processing request service of the RIC may be efficiently provided.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. The program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described example embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been illustrated and described with reference to various example embodiments thereof, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by an E2 node, the method comprising:
   generating a radio access network (RAN) intelligent controller (RIC) indication message comprising performance measurement information related to a digital unit (DU); and
   transmitting the RIC indication message to an RIC through an E2 interface,
   wherein the performance measurement information related to the DU comprises measurement information for one or more public land mobile networks (PLMNs), and
   wherein the measurement information comprises, regarding each PLMN: a PLMN identifier (ID); and at least one of $5^{th}$ generation core (5GC)-based DU measurement information or evolved packet core (EPC)-based DU measurement information.

2. The method of claim 1, wherein the 5GC-based DU measurement information comprises, regarding each slice: a slice ID; and usage information for one or more 5G quality of service (QoS) class identifiers (5QI), and
   wherein the usage information comprises, regarding each 5QI: a 5QI; and at least one of a downlink physical resource block (PRB) usage or an uplink PRB usage.

3. The method of claim 1, wherein the EPC-based DU measurement information comprises, regarding each quality of service (QoS) class identifier (QCI): a QCI ID; and at least one of a downlink physical resource block (PRB) usage or an uplink PRB usage.

4. The method of claim 1, wherein the performance measurement information related to the DU comprises at least one of: information regarding downlink available physical resource blocks (PRBs) or information regarding uplink available PRBs,
   wherein the downlink available PRBs refer to whole PRBs of a downlink which are available during a reported E2 period, and
   wherein the uplink available PRBs include whole PRB s of an uplink which are available during the reported E2 period.

5. The method of claim 1, wherein the RIC indication message comprises performance measurement information related to a central unit (CU)-control plane (CP), and
   wherein the performance measurement information related to the CU-CP comprises information regarding a number of active user equipments (UEs).

6. The method of claim 1, wherein the RIC indication message comprises performance measurement information related to a central unit (CU)-user plane (UP), and
   wherein the performance measurement information related to the CU-UP comprises at least one of 5GC-based CU measurement information or EPC-based CU measurement information.

7. The method of claim 6, wherein the 5GC-based CU measurement information comprises, regarding each slice: a slice ID; and usage information for one or more 5G quality of service (QoS) class identifiers (5QIs), and wherein the usage information comprises, regarding each 5QI: a 5QI; and at least one of a downlink packet data convergence protocol (PDCP) data size or an uplink PDCP data size.

8. The method of claim 6, wherein the EPC-based CU measurement information comprises, regarding each quality of service (QoS) class identifier (QCI): a QCI ID; and at least one of a downlink packet data convergence protocol (PDCP) data size or an uplink PDCP data size.

9. The method of claim 1, wherein the RIC is a near real time (RT) RIC, and
wherein the E2 node comprises an open-radio access network (O-RAN) distributed unit (O-DU), an O-RAN central unit-control plane (O-CU-CP), an O-RAN central unit-user plane (O-CU-UP), or an O-RAN eNodeB (O-eNB).

10. A method performed by a radio access network (RAN) intelligent controller (RIC), the method comprising:
receiving, from an E2 node through an E2 interface, an RIC indication message comprising performance measurement information related to a digital unit (DU),
wherein the performance measurement information related to the DU comprises measurement information for one or more public land mobile networks (PLMNs), and
wherein the measurement information comprises, regarding each PLMN: a PLMN identifier (ID); and at least one of $5^{th}$ generation core (5GC)-based DU measurement information or evolved packet core (EPC)-based DU measurement information.

11. The method of claim 10, wherein the RIC indication message is a a radio access network (RAN) intelligent controller (RIC) indication message comprising the performance measurement information related to the digital unit (DU), wherein the 5GC-based DU measurement information comprises, regarding each slice: a slice ID; and usage information for one or more 5G quality of service (QoS) class identifiers (5QI), and
wherein the usage information comprises, regarding each 5QI: a 5QI; and at least one of a downlink physical resource block (PRB) usage or an uplink PRB usage.

12. An apparatus for an E2 node, the apparatus comprising:
at least one processor; and
at least one transceiver,
wherein the at least one processor is configured to:
generate a radio access network (RAN) intelligent controller (RIC) indication message comprising performance measurement information related to a digital unit (DU); and
control the transceiver to transmit the RIC indication message to an RIC through an E2 interface,
wherein the performance measurement information related to the DU comprises measurement information for one or more public land mobile networks (PLMNs), and
wherein the measurement information comprises, regarding each PLMN: a PLMN identifier (ID); and at least one of $5^{th}$ generation core (5GC)-based DU measurement information or evolved packet core (EPC)-based DU measurement information.

13. The apparatus of claim 12, wherein the RIC indication message is a a radio access network (RAN) intelligent controller (RIC) indication message comprising the performance measurement information related to the digital unit (DU), wherein the 5GC-based DU measurement information comprises, regarding each slice: a slice ID; and usage information for one or more 5G quality of service (QoS) class identifiers (5QI), and
wherein the usage information comprises, regarding each 5QI: a 5QI; and at least one of a downlink physical resource block (PRB) usage or an uplink PRB usage.

14. An apparatus for a radio access network (RAN) intelligent controller (RIC), the apparatus comprising:
at least one processor; and
at least one transceiver,
wherein the at least one processor is configured to receive, from an E2 node through an E2 interface, an RIC indication message comprising performance measurement information related to a digital unit (DU),
wherein the performance measurement information related to the DU comprises measurement information for one or more public land mobile networks (PLMNs), and
wherein the measurement information comprises, regarding each PLMN: a PLMN identifier (ID); and at least one of $5^{th}$ generation core (5GC)-based DU measurement information or evolved packet core (EPC)-based DU measurement information.

15. The apparatus of claim 14, wherein the RIC indication message is a a radio access network (RAN) intelligent controller (RIC) indication message comprising the performance measurement information related to the digital unit (DU), wherein the 5GC-based DU measurement information comprises, regarding each slice: a slice ID; and usage information for one or more 5G quality of service (QoS) class identifiers (5QI), and
wherein the usage information comprises, regarding each 5QI: a 5QI; and at least one of a downlink physical resource block (PRB) usage or an uplink PRB usage.

* * * * *